United States Patent [19]

Ito et al.

[11] Patent Number: 4,839,487
[45] Date of Patent: Jun. 13, 1989

[54] WIRE ELECTRODE FOR WIRE-CUT ELECTRICAL DISCHARGE MACHINING

[75] Inventors: Haruhiko Ito; Yoshio Shibata; Masato Banzai; Takeshi Yatomi, all of Aichi, Japan

[73] Assignee: Mitsubishi Denki Kabushiki Kaisha, Tokyo, Japan

[21] Appl. No.: 937,428

[22] Filed: Dec. 3, 1986

Related U.S. Application Data

[63] Continuation of Ser. No. 628,538, Jul. 6, 1984, abandoned.

[30] Foreign Application Priority Data

Jul. 6, 1983 [JP] Japan ................. 58-122621
Jul. 11, 1983 [JP] Japan ................. 58-125716

[51] Int. Cl.$^4$ ............................................. B23H 7/08
[52] U.S. Cl. ............................................. 219/69.12
[58] Field of Search ................. 219/69 W, 69 E; 420/423; 148/12.4, 11.5 C, 143, 144, 434, 403; 164/463

[56] References Cited

U.S. PATENT DOCUMENTS

| | | | |
|---|---|---|---|
| 2,019,445 | 10/1935 | Crapo | 148/12.4 |
| 2,761,796 | 9/1956 | Wasserman | 219/69 E |
| 3,610,864 | 10/1971 | Kholodnov | 219/69 W |
| 3,845,805 | 11/1974 | Kavesh | 164/89 |
| 3,856,513 | 12/1974 | Chen et al. | 75/122 |
| 3,881,540 | 5/1975 | Kavesh | 164/463 |
| 4,056,411 | 11/1977 | Chen et al. | 148/403 |
| 4,135,924 | 1/1979 | Tanner et al. | 420/423 |
| 4,144,058 | 3/1979 | Chen et al. | 148/403 |
| 4,182,628 | 1/1980 | D'Silva | 148/403 |
| 4,287,404 | 9/1981 | Convers et al. | 219/69 W |
| 4,341,939 | 7/1982 | Briffod et al. | 219/69 W |
| 4,377,622 | 3/1983 | Liebermann | 428/605 |
| 4,410,490 | 10/1983 | Ray et al. | 148/403 |
| 4,424,432 | 1/1984 | Kaneko et al. | 219/69 W |
| 4,489,136 | 12/1984 | Bose et al. | 148/403 |
| 4,495,691 | 1/1985 | Masumoto et al. | 148/403 |
| 4,501,316 | 2/1985 | Ames et al. | 164/463 |
| 4,517,017 | 5/1985 | Inomato et al. | 148/403 |
| 4,527,614 | 7/1985 | Masumoto et al. | 164/463 |
| 4,529,458 | 7/1985 | Kushnick et al. | 148/403 |

FOREIGN PATENT DOCUMENTS

| | | | |
|---|---|---|---|
| 50479 | 4/1982 | European Pat. Off. | 148/403 |
| 2855858 | 7/1979 | Fed. Rep. of Germany . | |
| 2914368 | 10/1979 | Fed. Rep. of Germany | 219/69 W |
| 2824749 | 12/1979 | Fed. Rep. of Germany . | |
| 2921356 | 12/1979 | Fed. Rep. of Germany | 219/69 W |
| 2364131 | 6/1984 | Fed. Rep. of Germany . | |
| 53-57119 | 5/1978 | Japan | 148/403 |
| 55-64948 | 5/1980 | Japan | 164/463 |
| 125944 | 9/1980 | Japan | 219/69 W |
| 161128 | 10/1982 | Japan | 164/463 |
| 58-91155 | 5/1983 | Japan | 148/403 |
| 58-91157 | 5/1983 | Japan | 140/403 |
| 403525 | 12/1971 | U.S.S.R. | 219/69 E |
| 2075894 | 11/1981 | United Kingdom | 219/69 W |

OTHER PUBLICATIONS

Takayama, "Amorphous Structures and Their Formation and Stability," J. Mat. Sci., 11/(1976), pp. 164–185.
Nielsen, "An Estimate of the Glass Transition Temperature of Transition Metals Alloyed with Metalloids," Metallkde., 70, 1979, pp. 606–608.
Ito et al., "Magnetostriction and Magnetization of Iron-Based Amorphous Alloys," Appln. Phys. Let., 37, 1980, pp. 665–666.

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A wire electrode for use in wire-cut electrical discharge machining which can be used under a high machining tension and which produces no appreciable deposit on the workpiece it is used to machine. The wire of the invention may be made of an amorphous metal or amorphous alloy composed primarily of iron, cobalt, or copper, and coated on its surface with a layer of a metal such as zinc, magnesium, tin, lead, cadmium or alloys thereof. Alternatively, the wire electrode may be a wire of highly fine crystalline particles fabricated by superquenching from a pure metal or an alloy of a pure metal in a molten state at a cooling rate of $10^3$ to $10^5$ °C./sec in a super-quenching process such as a spinning process which forms a wire in a rotating liquid layer.

27 Claims, 5 Drawing Sheets

(A) AMORPHOUS-METAL WIRE ($Fe_{75} Si_{10} B_{15}$)

(B) CONVENTIONAL STEEL WIRE (A) AMORPHOUS-METAL WIRE ($Fe_{75}Si_{10}B_{15}$)

(B) CONVENTIONAL STEEL WIRE

WIRE ELECTRODE FOR WIRE-CUT ELECTRICAL DISCHARGE MACHINING

This is a continuation of application Ser. No. 628,538 filed July 6, 1984, now abandoned.

BACKGROUND OF THE INVENTION

The present invention relates to a wire electrode for use in a wire-cut electrical discharge machining process.

Wire electrodes for wire-cut electrical discharge machining are generally in the form of a wire of copper, brass, tungsten or the like and having a diameter in a range of from 0.05 to 0.3 mm. FIG. 1 of the accompanying drawings is illustrative of the manner in which electrical discharge machining is carried out with such a wire electrode. The wire electrode, designated at 1, is tensioned and fed at a constant speed in the direction of the arrow A while being held in a confronting relation to a workpiece 2. Then, a machining solution 3 is applied in a direction coaxial with the wire electrode 1 while a pulsed voltage is impressed between the wire electrode 1 and the workpiece 2. An electrical discharge is now repeatedly produced through the medium of the machining solution 3 across a small gap between the wire electrode 1 and the workpiece 2 to melt and scatter away a desired amount of material of the workpiece 2 by heat energy generated upon the electrical discharge. An XY crosstable (not shown) coupled to the workpiece 2 is numerically controlled to achieve desired relative movement between the wire electrode 1 and the workpiece 2 while keeping the electrode-to-workpiece gap constant at all times and ensuring continuous electrical discharge.

By repeating the electrical discharge and controlling the XY crosstable in the above manner, a groove 4 can be continuously cut in the workpiece 2 to machine the workpiece 2 to a desired contour. Such wire-cut electrical discharge machining has been widely used in blanking and cutting general dies, for example.

The speed of wire-cut machining is dependent on the degree of tension applied to the wire electrode 1, as shown in FIG. 2 where the abscissa indicates the tension T (g) and the ordinate the cutting speed F (mm/minute). FIG. 2 shows a characteristic curve which progressively rises as it goes to the right, the indication being that the cutting speed is higher as the tension is larger. It has been confirmed that as the tension is made larger, the wire electrode 1 is subjected to smaller vibrations and the electrode-to-workpiece gap can be controlled more uniformly for stabler electrical discharge repetitions, resulting in a higher cutting speed.

One conventional electrode is disclosed in U.S. Pat. No. 4,287,404, entitled "Electrode for Electrical Discharge Machining", in which a wire electrode for electrical discharge machining is made of a material of high tensile strength and a metal of good machinability.

Wire electrodes of copper, brass or steel, for example, having conventional crystalline structures suffer a limitation on the tensile strength thereof, and it is not possible to achieve a higher cutting speed through an increase in tensile strength.

When a conventional wire electrode 1 of copper, brass or steel is fed upwardly or downwardly with respect to a workpiece during machining as shown in FIG. 3, portions of the wire electrode 1 are often scattered and deposited on an upper or lower end of a groove 4 cut in the workpiece 2. The deposited material 5 is mainly composed of copper or steel, and it has been observed that the material is deposited behind the wire electrode 1 as it cuts into the workpiece 2 as illustrated in FIGS. 3A, 3B, 4A and 4B. The deposit 5 on the machined surface tends to impair the dimensional accuracy of the cut groove 4. Such a deposited layer 5 has a thickness in the range of about 10 to 100 microns in areas where large machining energy is applied. As the machining energy is increased, the cut groove 4 is sometimes filled with the deposited material as shown in FIG. 4. This undesirable phenomenon results in various shortcomings. The workpiece having been machined cannot be removed from the wire electrode. During machining, the machining solution 3 ejected coaxially with the wire electrode 1 does not enter the electrode-to-workpiece gap, causing a gaseous electrical discharge to lower the cutting speed and resulting in the danger of breaking the wire electrode 1. The deposit 5 mainly of copper, iron or the like, can only be removed with a dangerous chemical such as fuming nitric acid, a procedure which is tedious, timeconsuming, and unsafe.

Therefore, the conventional wire electrodes have suffered from many difficulties and have proven unsatisfactory.

SUMMARY OF THE INVENTION

The present invention has been made in view of the foregoing conventional drawbacks.

It is an object of the present invention to provide a wire electrode which has a high tensile strength, will deposit no appreciable amount of its material on a workpiece, and can machine a workpiece at an increased speed and a high accuracy.

The wire electrode of the invention comprises a wire made of an amorphous metal or an amorphous alloy which may be coated on its surface with a layer of a metal such as zinc, magnesium, tin, lead, aluminum, cadmium or alloys thereof.

Alternatively, the wire electrode may be a wire of highly fine crystalline particles which is fabricated by being super-quenched from a pure metal or an alloy in its molten state at a cooling rate of $10^3$ to $10^5$ °C./sec in a super-quenching process such as a spinning process which forms a wire in a rotating liquid layer. Alternatively, the wire thus fabricated is further drawn into a thin wire for use as a wire electrode.

The inventor has found that the wire electrode of the invention has a tensile strength much higher than that of conventional wire electrodes.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7A and 7B are schematic views of other spinning machines used for producing a wire electrode according to the present invention; and FIGS. 8 and 9 are cross-sectional views of wire electrodes according to the present invention.

DESCRIPTION OF THE PREFERRED EMBODIMENTS

The wire electrodes heretofore used in wire-cut electrical discharge machining have had crystalline structures which fail to provide a high tensile strength.

EXAMPLE 1

According to this example, a pure metal or an alloy in a molten state is quenched by a super-quenching process such as a spinning process for producing a thin amorphous wire in a rotating liquid layer. The rate of quenching the metal or alloy is in the range of $10^5$ to $10^6$ °C./sec. The thus-produced thin amorphous wire may be used directly as a wire electrode, or it may further be drawn into a wire electrode. The resultant wire electrode has a tensile strength much higher than that of the prior wire electrodes.

Figure 6A:
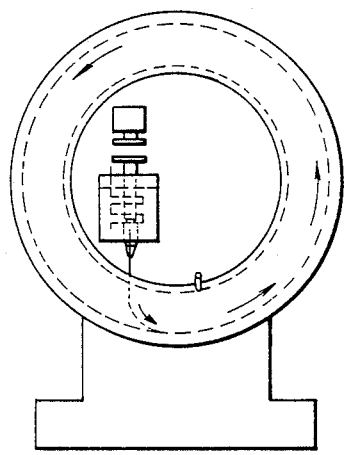
FIGS. 6A and 6B are schematic views of a spinning device using a rotating liquid layer for producing a wire electrode according to the present invention.
Figure 6B:
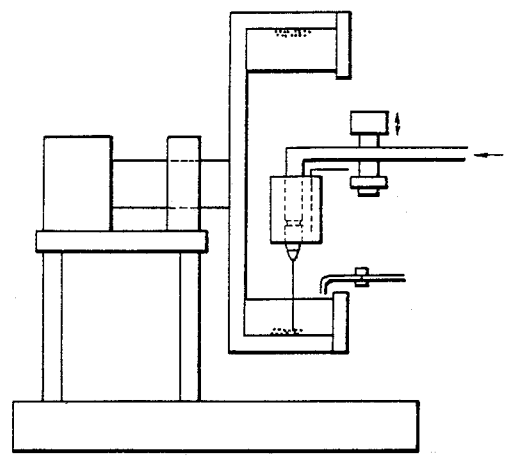

FIGS. 6A and 6B schematically show a spinning device for forming an amorphous wire in a rotating liquid layer, the spinning device being generally composed of a heating furnace, an ejector for ejecting molten metal, and a cooling unit for cooling a rotating drum. The rotating drum has an inside diameter of 600 mm and, when rotated, forms a uniform rotating layer of water on an inner periphery. The molten metal is ejected in the same manner as an amorphous ribbon is formed, but is ejected through a nozzle having a circular cross section. The spinning process continuously forms an amorphous wire which is accumulated in cooling water in the drum, the amorphous wire thus fabricated having a diameter ranging from 100 to 200 microns for an iron-base metal.

Other super-quenching processes include a spinning process for forming an amorphous wire in a water stream and a spinning process for forming an amorphous wire coated with glass, as shown in FIGS. 7A and 7B, respectively.

Figure 1A:
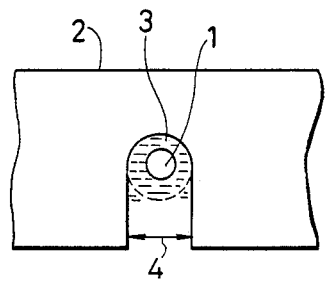
FIGS. 1A and 1B are diagrams showing a wire-cut electrical discharge machining process using a conventional wire electrode.
Figure 1B:
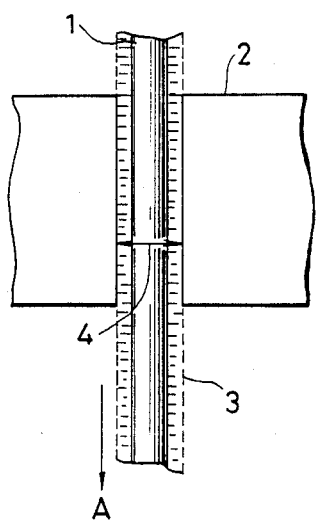
Figure 2:
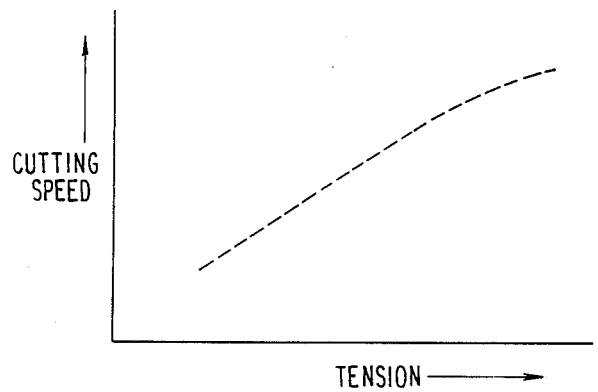
FIG. 2 is a diagram showing the relationship between wire electrode tension and cutting speed.
Figure 3A:
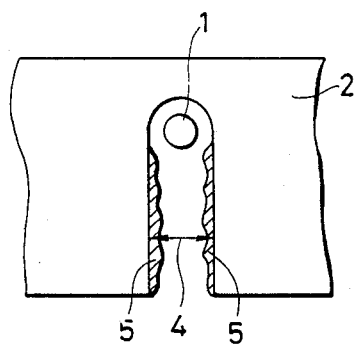
FIGS. 3A, 3B, 4A and 4B are diagrams showing the manner in which the material of conventional wire electrodes is deposited on surfaces of workpieces being machined.
Figure 3B:
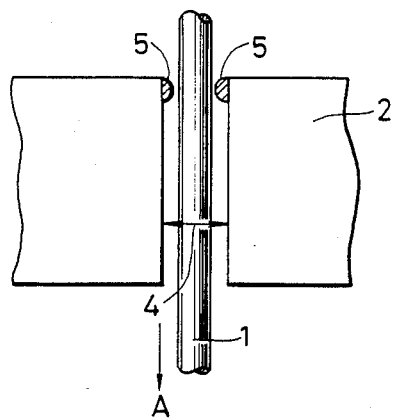
Figure 4A:
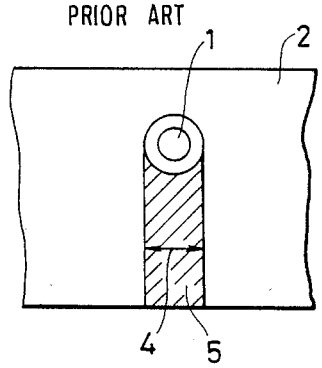
Figure 4B:
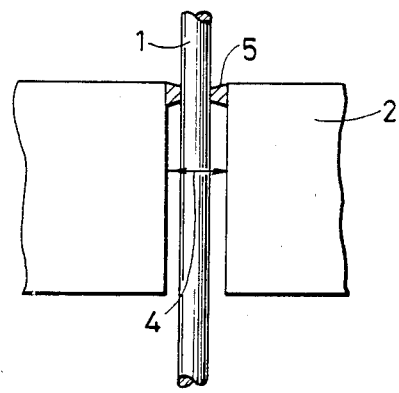
Figure 5:
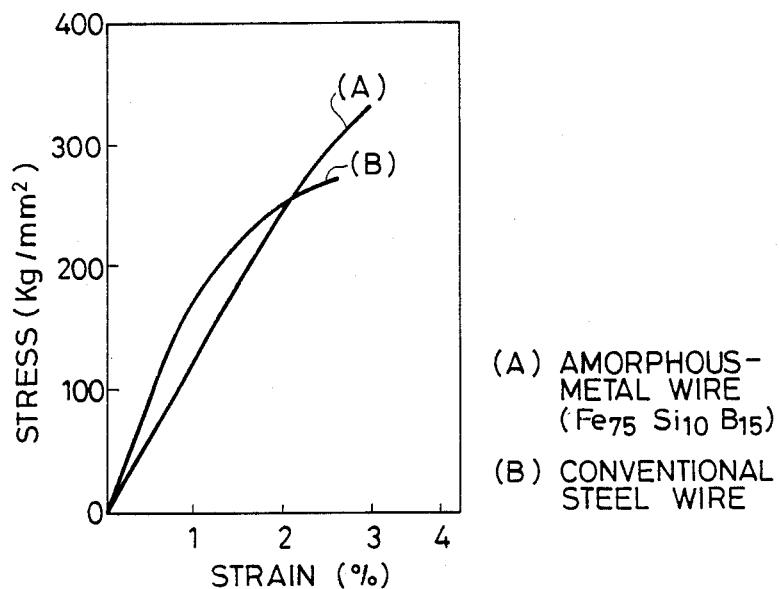
FIG. 5 is a diagram showing stress vs. strain curves of an amorphous wire and a piano wire.

Amorphous-metal wires generally have a tensile strength which is 1.5 to 3 times that of crystalline-metal wires. As an example, FIG. 5 illustrates stress vs. strain curves of an amorphous-metal wire and a conventional piano wire.

Wire electrodes are made of copper or a copperbase alloy. Where an amorphous wire electrode is made of copper-base metal, part of the wire electrode will be scattered and deposited on a machined surface of a workpiece due to the electrical discharge.

To prevent the electrode material from being scattered and deposited, an amorphous wire electrode 6 (FIG. 8) is coated on its surface with a layer 7 of a material having a low melting point and which is capable of being easily evaporated, such as zinc, magnesium, tin, lead, aluminum, cadmium or alloys thereof. The wire electrode thus constructed will produce substantially no deposit on the workpiece.

The amorphous-metal wire electrode thus fabricated by super-quenching molten metal has a tensile strength which is 1.5 to 3 times that of conventional crystalline-metal wire electrodes. Since the tension applied to the amorphous-metal wire electrode can be increased in actual machining operation, the machining speed can be increased and the machining accuracy can also be improved.

Table 1 shows a comparison of various characteristics of a conventional wire electrode of brass plated with a coating layer of zinc about 10 microns thick, a wire electrode of brass, and a wire electrode of copper, the characteristics being obtained when machining a steel workpiece and indicated by way of percentage with brass characteristics used as a reference. Table 1 clearly indicates that the zinc coating layer is highly effective in reducing the unwanted wire material deposit and increasing the machining speed. It is apparent that the advantage of the coating layer remains the same when the electrode core is an amorphous-metal wire.

TABLE 1

| Wire electrode material | Diameter (mm) | Coating thickness (microns) | Deposit | Tensile strength | Machining speed |
|---|---|---|---|---|---|
| Brass | 0.2 | — | 100 | 100 | 100 |
| Copper | 0.2 | — | 700 | 50 | 80 |
| Zinc-coated brass | 0.2 | 10 | 5–8 | 75 | 180 |

The amorphous wire electrode of the present invention may be made of any metal that can be in an amorphous state. Since the wire electrode should be of good conductivity, the amorphous wire electrode may be coated with electrically conductive material. FIG. 9 shows such a multilayer amorphous wire electrode comprising an amorphous wire electrode 6, a layer 8 of electrically conductive material coated on the amorphous wire electrode 6, and a layer 7 of metal or alloy coated on the layer 8 for preventing electrode material from being scattered and deposited on a workpiece. The multilayer-coated amorphous wire electrode can machine workpieces at an increased machining accuracy and speed.

Metals and alloys that can be used to prepare amorphous wires of the invention include:

1. Pure metal or alloys of pure metal;
2. Iron, aluminum, magnesium, copper, cobalt, niobium and alloys thereof;
3. Iron-base alloy (alloy composed mainly of iron), copper-base alloy (alloy composed mainly of copper), and cobalt-base alloy (alloy composed mainly of cobalt);
4. Fe - Si - B alloy,
   Fe - P - C alloy (Fe - P - C - Cr alloy), and
   Fe - Co - Si - B alloy;

Cu - Zr alloy,
   Cu - Sn - P alloy, and
   Cu - Zn - Ag alloy;

Co - Nb - B alloy, and
   Co - Fe - Si - B alloy;
5. Fe=70–75%, Si=10%, B=15–20%,
   Fe=72–77.5%, P=12.5%, C=10% (Cr=0–5.5%), and
   Fe=71%, Co=4%, Si=10%, B=15%;
   Cu=60%, Zr=40%,
   Cu=65–70%, Zn=20–25%, Ag=5–15%, and
   Cu=70–80%, Sn=10–20%, P=0–10%;
   Co=67.5%, Fe=5%, Si=12.5%, B=15%

Other advantages of the amorphous wire electrode than the higher tensile strength are as follows:

By adding a passive film element such as Cr, corrosion resistance capability is greatly increased. Where a wire electrode is made of an amorphous metal alloy only with no surface coating, the fabricated wire electrode can be packaged in a simple process. Under current practice, wire electrodes are made of brass and packaged by vacuum packaging. However, the amorphous wire electrodes of the invention can be packaged more easily.

In general, amorphous wire electrodes with no passive film formed thereon have a surface which is highly chemically active. By coating such an electrode surface with Zn or the like, a strong and stable bond will be formed between the electrode surface and the coating.

Advantages in the manufacturing process are as follows: Wire electrodes can be completed simply by ejecting a molten metal material for super-quenching. It is not necessary therefore to repeat conventional wire drawing processes to form a thin wire. Accordingly, the manufacturing process can be simplified and the time required for manufacturing a wire electrode can be shortened.

EXAMPLE 2

A molten metal is super-quenched at a cooling rate of $10^3$ °C./sec or higher to fabricate a highly fine crystalline wire. The highly fine crystalline wire has a tensile strength that is 1.5 to 2 times that of a conventional wire electrode as indicated in Table 2. The highly fine crystalline wire electrode, if made primarily of copper, will have its material deposited on a workpiece during machining operation. This is true of a highly fine crystalline wire electrode if made primarily of steel. To avoid this shortcoming, the wire electrode is coated on its surface with a layer of a material having a low melting point and capable of being easily evaporated, such as zinc, magnesium, tin, lead, aluminum, cadmium or alloys thereof, as illustrated in FIG. 8. The wire electrode thus constructed will produce substantially no deposit on the workpiece and will increase the machining accuracy and speed.

TABLE 2

| Wire type | Cooling rate (°C./sec) | Crystal particle dia. (mm) | Tensile strength (kg/mm$^2$) | Machining speed (mm$^2$/sec) |
|---|---|---|---|---|
| 1 | up to 10 | 0.025-0.03 | 50 | 80 |
| 2 | ~10$^3$ or higher | 0.001-0.005 | 90 | 120 |

1: Conventional copper wire
2: Highly fine crystalline copper wire

Table 3 shows a comparison of various characteristics of a conventional wire electrode of brass plated with a coating layer of zinc about 10 microns thick, a wire electrode of brass, and a wire electrode of copper, the characteristics being obtained when machining a steel workpiece and indicated by way of percentage with brass characteristics used as a reference. Table 3 clearly indicates that the zinc coating layer is highly effective in reducing the unwanted wire material deposit and increasing the machining speed. It is apparent that the advantage of the coating layer remains the same when the electrode core is a highly fine crystalline wire.

TABLE 3

| Wire electrode material | Diameter (mm) | Coating thickness (microns) | Deposit | Tensile strength | Machining speed |
|---|---|---|---|---|---|
| Brass | 0.2 | — | 100 | 100 | 100 |
| Copper | 0.2 | — | 700 | 50 | 80 |
| Zinc-coated brass | 0.2 | 10 | 5-8 | 75 | 180 |

The highly fine crystalline wire electrode of the present invention may be made of any metal that can have finely divided crystalline particles when super-quenched from its molten state. Since the wire electrode should be of good conductivity, the wire electrode may be coated with a electrically conductive material. More specifically, as illustrated in FIG. 9, a highly fine crystalline wire electrode 6 is coated with a layer 8 of electrically conductive material, which in turn is coated with a layer 7 of zinc, magnesium, tin, lead, aluminum, cadmium or alloys thereof for preventing electrode material from being scattered and deposited on a workpiece. The multilayer-coated highly-fine crystalline wire electrode can machine workpieces at an increased machining accuracy and speed.

As described above, the wire electrode for use in wire-cut electrical discharge machining according to the present invention has many practical advantages.

Although certain preferred embodiments have been shown and described, it should be understood that many changes and modifications may be made therein without departing from the scope of the appended claims.

We claim:

1. In an electrical discharge machining (EDM) apparatus for machining a workpiece, said apparatus comprising a pulsed voltage source and an EDM electrode, said pulsed voltage source applying a pulsed voltage between said EDM electrode and said workpiece to machine said workpiece, the improvement wherein said EDM electrode comprises a wire made of at least one of an amorphous metal and an amorphous alloy.

2. An EDM maching apparatus according to claim 1, wherein said wire is drawn into a thin wire.

3. An EDM maching apparatus according to claim 1, wherein said pure metal is selected from the group consisting of iron, aluminum, magnesium, copper, cobalt and niobium.

4. An EDM maching apparatus according to claim 1, wherein said alloy contains at least two of iron, aluminum, magnesium, copper, cobalt and niobium.

5. An EDM maching apparatus according to claim 1, wherein said alloy is composed primarily of iron.

6. An EDM maching apparatus according to claim 5, wherein said alloy comprises an Fe - Si - B alloy.

7. An EDM maching apparatus according to claim 6, wherein Fe=70-75%, Si=10% and B=15-20%.

8. An EDM maching apparatus according to claim 5, wherein said alloy comprises an Fe - P - C alloy.

9. An EDM maching apparatus according to claim 8, wherein Fe=72-77.5%, P=12.5% and C=10%.

10. An EDM maching apparatus according to claim 9, wherein said alloy further contains Cr=0-5.5%.

11. An EDM maching apparatus according to claim 5, wherein said alloy comprises an Fe - Co - Si - B alloy.

12. An EDM maching apparatus according to claim 11, wherein Fe=71%, Co=4%, Si=10% and B=15%.

13. An EDM maching apparatus according to claim 1, wherein said alloy is composed primarily of copper.

14. An EDM maching apparatus according to claim 13, wherein said alloy comprises a Cu - Zr alloy.

15. An EDM maching apparatus according to claim 14, wherein Cu=60% and Zr=40%.

16. An EDM maching apparatus according to claim 13, wherein said alloy comprises a Cu - Sn - P alloy.

17. An EDM maching apparatus according to claim 16, wherein Cu=70-80%, Sn=10-20% and P=0-10%.

18. An EDM maching apparatus according to claim 13, wherein said alloy comprises a Cu - Zn - Ag alloy.

19. An EDM maching apparatus according to claim 18, wherein Cu=65-70%, Zn=20-25% and Ag=5-15%.

20. An EDM maching apparatus according to claim 1, wherein said alloy is composed primarily of cobalt.

21. An EDM maching apparatus according to claim 20, wherein said alloy comprises a Co - Nb - B alloy.

22. An EDM maching apparatus according to claim 20, wherein Co=67.5%, Fe=5%, Si=12.5% and B=15%.

23. An EDM maching apparatus according to claim 1, wherein said wire is coated on its surface with a metal selected from the group consisting of zinc, magnesium, tin, lead, aluminum, cadmium and their alloys.

24. An EDM machining apparatus according to claim 23, wherein said wire is further coated with a layer of electrically-conductive material over said metal selected from said group.

25. In an electrical discharge machining (EDM) apparatus for machining a workpiece, said apparatus comprising a pulsed voltage source and an EDM electrode, said pulsed voltage source applying a pulsed voltage between said EDM electrode and said workpiece to machine said workpiece, the improvement wherein said EDM electrode comprises a wire made of highly fine crystalline particles of at least one of a pure metal or an alloy of a pure metal, said particles having a diameter in a range from 0.001 to 0.005 mm.

26. An EDM machining apparatus according to claim 25, wherein said wire is coated on its surface with a metal selected from the group consisting of zinc, magnesium, tin, lead, aluminum, cadmium and alloys thereof.

27. An EDM machining apparatus according to claim 26, wherein said wire is further coated with a layer of electrically conductive material over said metal selected from said group.

* * * * *